United States Patent
Givoly (10) Patent No.: US 7,266,602 B2
(45) Date of Patent: *Sep. 4, 2007

(54) SYSTEM, METHOD AND COMPUTER PROGRAM PRODUCT FOR PROCESSING ACCOUNTING INFORMATION

(75) Inventor: Tal Givoly, Cupertino, CA (US)

(73) Assignee: Amdocs (Israel) Ltd., Ra'anana (IL)

(*) Notice: Subject to any disclaimer, the term of this patent is extended or adjusted under 35 U.S.C. 154(b) by 0 days.

This patent is subject to a terminal disclaimer.

(21) Appl. No.: 11/441,423

(22) Filed: May 24, 2006

(65) Prior Publication Data

US 2006/0212586 A1 Sep. 21, 2006

Related U.S. Application Data

(63) Continuation of application No. 09/924,391, filed on Aug. 7, 2001, now Pat. No. 7,099,940.

(60) Provisional application No. 60/223,129, filed on Aug. 7, 2000.

(51) Int. Cl.
*G06F 15/173* (2006.01)

(52) U.S. Cl. ............... 709/224; 709/223; 709/232; 726/22; 726/23

(58) Field of Classification Search ........ 709/223–224, 709/232–235, 238; 726/22–23
See application file for complete search history.

(56) References Cited

U.S. PATENT DOCUMENTS

| | | | | |
|---|---|---|---|---|
| 5,991,881 A * | 11/1999 | Conklin et al. | ............ | 709/224 |
| 6,055,508 A * | 4/2000 | Naor et al. | ............ | 705/11 |
| 6,115,393 A * | 9/2000 | Engel et al. | ............ | 370/469 |
| 6,219,786 B1 * | 4/2001 | Cunningham et al. | ...... | 709/229 |
| 6,279,113 B1 * | 8/2001 | Vaidya | ............ | 726/23 |
| 6,301,668 B1 * | 10/2001 | Gleichauf et al. | ............ | 726/22 |
| 6,363,489 B1 * | 3/2002 | Comay et al. | ............ | 726/22 |
| 6,405,251 B1 * | 6/2002 | Bullard et al. | ............ | 709/224 |
| 6,442,615 B1 * | 8/2002 | Nordenstam et al. | ....... | 709/224 |
| 6,453,345 B2 * | 9/2002 | Trcka et al. | ............ | 709/224 |
| 6,711,127 B1 * | 3/2004 | Gorman et al. | ............ | 726/23 |
| 6,735,702 B1 * | 5/2004 | Yavatkar et al. | ............ | 726/13 |
| 6,772,349 B1 * | 8/2004 | Martin et al. | ............ | 726/22 |
| 6,834,310 B2 * | 12/2004 | Munger et al. | ............ | 709/235 |
| 7,099,940 B2 * | 8/2006 | Givoly | ............ | 709/224 |

* cited by examiner

*Primary Examiner*—Philip Tran
(74) *Attorney, Agent, or Firm*—Zilka-Kotab, PC (57) ABSTRACT

A system, method and computer program product are provided for processing accounting information. In use, accounting information is received over a network. After receiving the accounting information, at least a portion of the accounting information that occurs during a surge in network traffic is discarded, based on at least one attribute of the accounting information. Further, at least a portion of the accounting information is processed, based on at least one attribute of the accounting information. Still yet, after the processing, at least a portion of remaining accounting information is allowed to pass to subsequent processing. To this end, the portion of the accounting information that is discarded is done so to prevent an overload of the subsequent processing.

23 Claims, 5 Drawing Sheets

SYSTEM, METHOD AND COMPUTER PROGRAM PRODUCT FOR PROCESSING ACCOUNTING INFORMATION

RELATED APPLICATION(S)

The present application is a continuation of an application filed Aug. 7, 2001 under Ser. No. 09/924,391, now U.S. Pat. No. 7,099,940 which, in turn, claims the priority of a provisional application filed Aug. 7, 2000 under Ser. No. 60/223,129, which is incorporated herein by reference for all purposes.

FIELD OF THE INVENTION

The present invention relates to network accounting, and more particularly to processing network accounting information for the purpose of dealing with network attacks and/or other network conditions.

BACKGROUND OF THE INVENTION

Network accounting involves the collection of various types of information pertaining to the data communications over a network, and sending and receiving information over a network. Examples of such information may include, but is not limited to a communication session's source, destination, user name, duration, time, date, type of server, volume of data transferred, etc. Armed with such accounting information, various services may be provided that require network usage metering of some sort.

Networks are often subject to various attacks wherein a perpetrator attempts to infiltrate a system. During a denial of service (Dos) attack, a network failure is likely to occur as a result of data being transmitted over the network. Accompanying such attacks is a surge in the amount of accounting information that is generated by various devices. Such accounting information is collected and sent to the back-end systems such as Operation and Business Support Systems (OSS/BSS). Overwhelmed by the overload situation, back-end systems may fail leading to the loss of valuable network accounting information and loss of service revenue ultimately.

For instance, if a computer attempts an attack, i.e. syn or fin, on a network, it will scan a plurality of ports. There are generally 65,536 ports to scan for a network device, and all this takes place over a very short period of time, typically several seconds. In general, the amount of network traffic generated by these attacks is negligible (as the data associated with attacks is generally of control and management nature that is short and can often be encapsulated in a small data packet), but the amount of accounting data created is large as accounting data is generated for events happening in the network. For instance, it would create 65,536 log entries in a firewall log, or up to 131,072 NetFlow flows, for each host that it attempts to attack. If a ping attack is used, then a plurality of Internet Protocol (IP) addresses is scanned in a similar fashion.

By way of background, a port is a "logical connection end-point" that associates a communication channel with entities running on a server or a client. Typical entities may be a program or an application executed on the client or server. A communication channel may be established as TCP connections using the Internet Protocol. Higher-layer applications that use TCP/IP such as the Web protocol, HTTP, have ports with pre-assigned numbers. These are known as "well-known ports" that have been assigned by the Internet Assigned Numbers Authority (IANA). Other application processes are given port numbers dynamically for each connection. When a service (server program) initially is started, it is said to bind to its designated port number. As any client program wants to use that server, it also must request to bind to the designated port number. Port numbers are from 0 to 65535. Ports 0 to 1023 are reserved for use by certain privileged services. For the HTTP service, port 80 is defined as a default and it does not have to be specified in the Uniform Resource Locator (URL).

A port scan is a series of messages sent by someone attempting to break into a computer to learn which computer network services, each associated with a "well-known" port number, the computer provides. Port scanning, a favorite approach of computer hackers, gives the assailant an idea where to probe for network weaknesses. Essentially, a port scan consists of sending a message to each port, one at a time. The kind of response received indicates whether the port is used and can therefore be probed for weakness.

Exemplary Types of Port Scans Include:
  Vanilla—An attempt to connect to all ports (there are 65,536)
  Strobe—An attempt to connect to only selected ports (typically, under 20)
  Stealth scan—Several techniques for scanning that attempt to prevent the request for connection being logged
  FTP Bounce Scan—Attempts that are directed through an FTP server to disguise the cracker's location
  Fragmented Packets—Scans by sending packet fragments that can get through simple packet filters in a firewall
  UDP—Scans for open UDP ports
  Sweep—Scans the same port on a number of computers Unwanted accounting information surges can also occur as a result of situations other than network attacks. For example, information may be collected from unreliable sources. Further, a storage capacity of a system may be inadequate. In still other situations, some information may be deemed pertinent, while other data may be deemed expendable.

There is therefore a need for a technique of identifying attacks and/or other network conditions; and more importantly, preventing the propagation of large amounts of accounting information to back-end systems which may in turn result in undesired failure in the network accounting process.

SUMMARY

A system, method and computer program product are provided for processing accounting information. In use, accounting information is received over a network. After receiving the accounting information, at least a portion of the accounting information that occurs during a surge in network traffic is discarded, based on at least one attribute of the accounting information. Further, at least a portion of the accounting information is processed, based on at least one attribute of the accounting information. Still yet, after the processing, at least a portion of remaining accounting information is allowed to pass to subsequent processing. To this end, the portion of the accounting information that is discarded is done so to prevent an overload of the subsequent processing.

DETAILED DESCRIPTION

Figure 1:
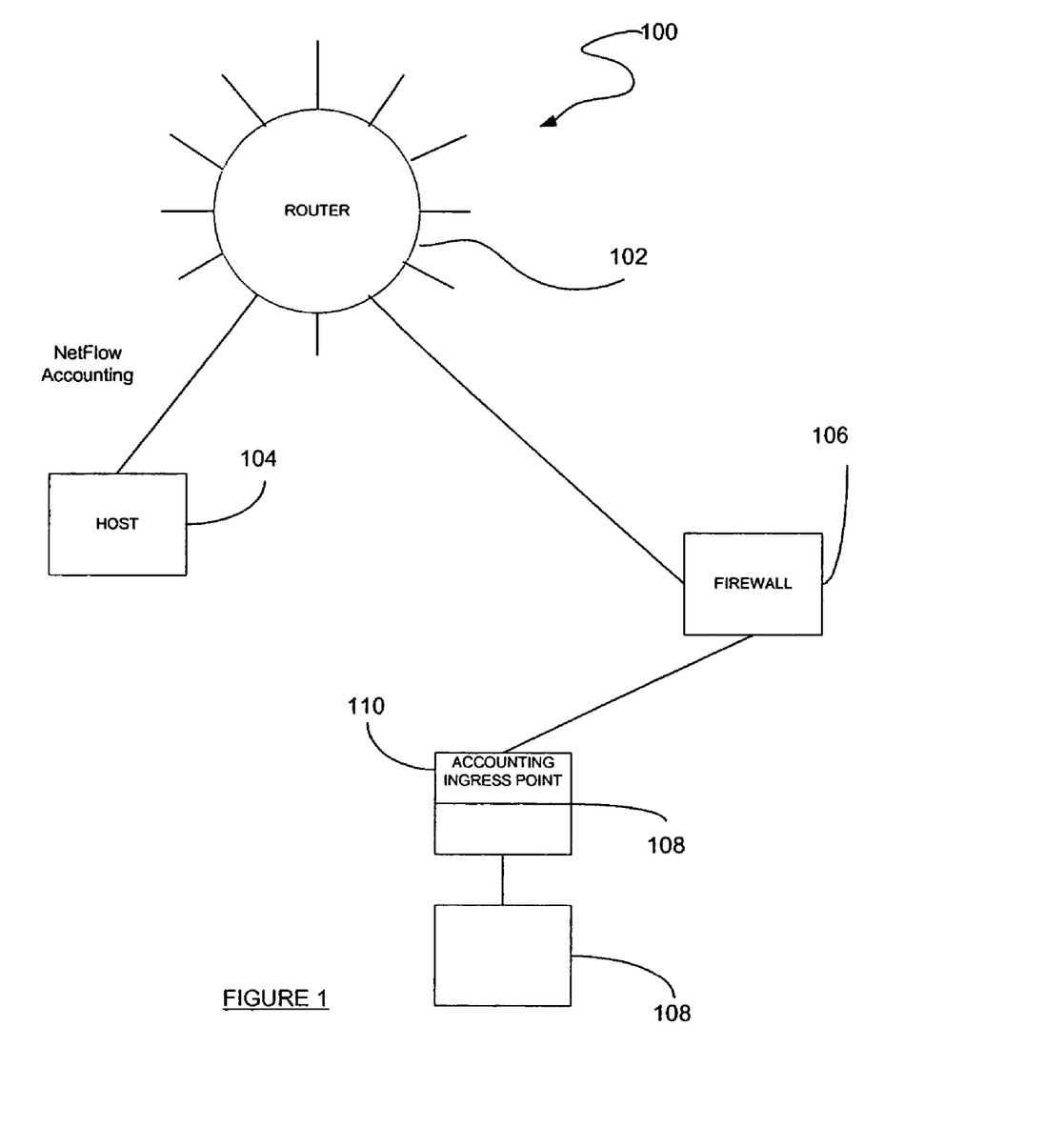
FIG. 1 illustrates an exemplary network on which one embodiment of the present invention may be implemented.

FIG. 1 illustrates an exemplary network framework 100 on which one embodiment of the present invention may be implemented. As shown, various network components may be provided including a router 102 for routing information between various portions of the network. In one embodiment, such network may include the Internet using a communication protocol such as TCP/IP. It should be noted, however, that the network may include any type of network including, but not limited to a wide area network (WAN), local area network (LAN), and metropolitan area network (MAN) etc.

Further provided is a host 104 coupled to the router 102 for sending information thereto and receiving information therefrom. A firewall 106 may also be coupled to the router 102 for controlling access to a plurality of interconnected devices 108. While various network components have been disclosed, it should be understood that the present invention may be implemented in the context of any type of network architecture and in any type of network device such as proxy servers, mail servers, hubs, directory servers, application servers, etc.

Figure 2:
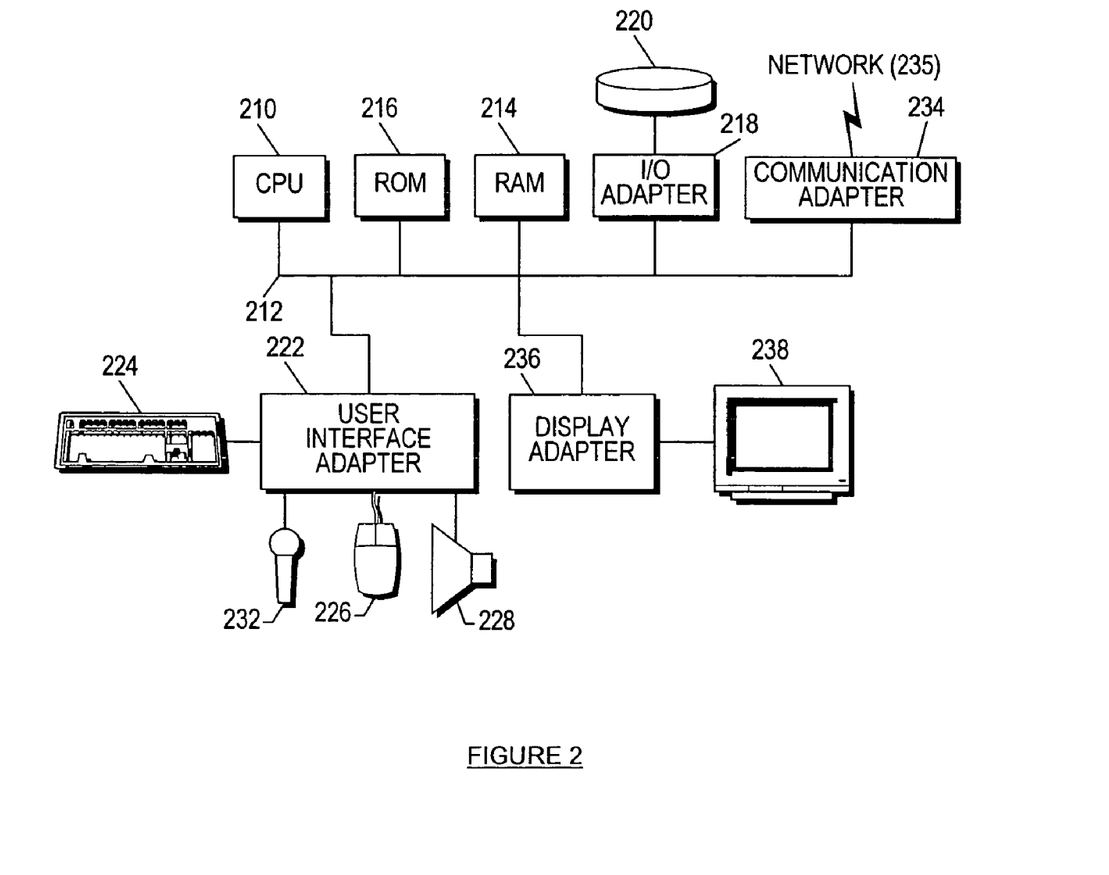
FIG. 2 shows a representative hardware environment associated with the host, devices, etc. shown in the network diagram of FIG. 1.

FIG. 2 shows a representative hardware environment associated with the various devices, i.e. host, device, etc. shown in the network diagram of FIG. 1. Such figure illustrates a typical hardware configuration of a workstation in accordance with a preferred embodiment having one or more central processing unit 210, such as microprocessors, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238. It should be noted the foregoing architecture is set forth for illustrative purposes only. Other application specific integrated circuit (ASIC) architectures may also be used as well as any other desired frameworks, per the desires of the user.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

During use of the various components shown in FIGS. 1 and 2, accounting information relating to network traffic and sessions is collected and tracked by the various hosts 104 and devices 108 at an accounting ingress point 110. Examples of such information may include, but are not limited to a session's source, destination, user name, duration, time, date, type of server, volume of data transferred, etc. Armed with such accounting information, various services and business applications, i.e. billing, security, etc. may be provided that require network usage metering of some sort.

Figure 3:
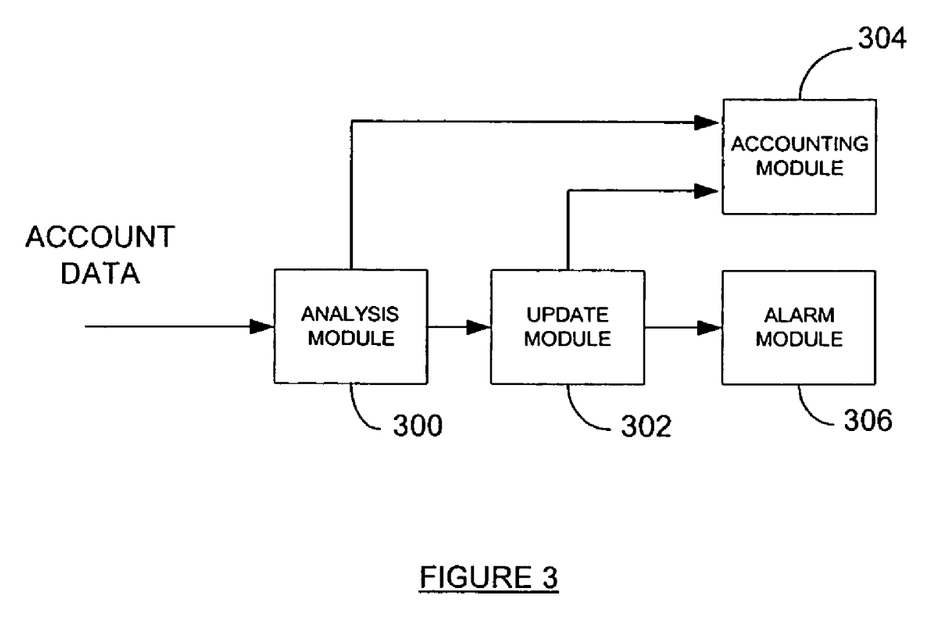
FIG. 3 is a schematic diagram illustrating the various components used for processing network accounting information in accordance with one embodiment of the present invention.

FIG. 3 is a schematic diagram illustrating the various exemplary components used for processing network accounting information at a network component such as those disclosed during reference to FIG. 1. As shown, an analysis module 300 is included for receiving accounting information, or data, for analyzing the same. Such analysis may include the identification of trends relating to various attributes associated with the received accounting information. Examples of such attributes include source address, destination address, end point port number or equivalent, protocol type, user identification, number of input IP packets, number of IP packets in a session or flow, time of the reception of an IP packet, etc. Additional information relating to the manner in which such functionality is accomplished will be set forth in greater detail during reference to FIGS. 4 and 5.

With continuing reference to FIG. 3, an update module 302 is coupled to the analysis module 300 for maintaining aggregations that are established after a trend is detected. The aggregations are a plurality of records with common attributes. In particular, an aggregation may refer to a plurality of records with the identical subset of attributes (representing some aspect of the record). Both the update module 302 and the analysis module 300 feed an accounting module 304 for monitoring the network accounting information. Also coupled to the update module 302 and the analysis module 300 is an alarm module 306 for providing alerts upon certain criteria being met. Additional information relating to the manner in which such functionality is accomplished will be set forth in greater detail during reference to FIGS. 4 and 5.

It should be noted that the foregoing architecture is set forth for illustrative purposes only, and should not be construed as limiting in any manner. In particular, the functionality set forth hereinafter may be implemented in the context of any desired feasible framework.

Figure 4:
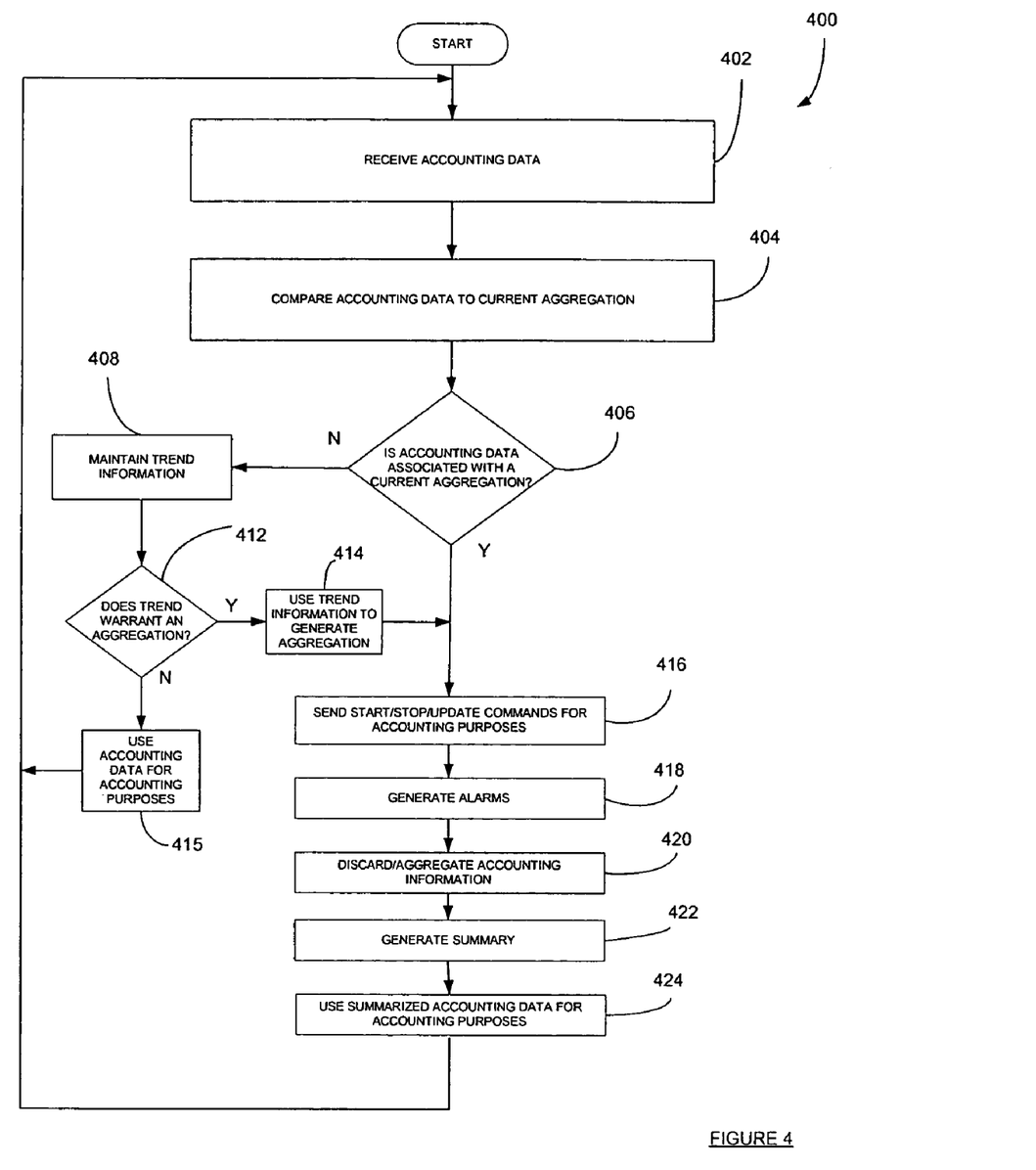
FIG. 4 is a flowchart showing one method of processing network accounting information.

FIG. 4 is a flowchart showing one method 400 of processing network accounting information in accordance with one embodiment of the present invention. Initially, in operation 402, accounting information, or data, is received by the analysis module 300. Thereafter, in operation 404, a real-time comparison is performed on each packet or aspects of accounting information. Such comparison involves various attributes and statistics of the received accounting information, and various aggregations of accounting information that were previously identified.

Based on the foregoing comparison, it is determined in decision 406 whether the accounting information is associated with a currently existing aggregation. For example, one current aggregation may include a plurality of packets of accounting information which indicate that a plurality of successive ports and/or Internet Protocol (IP) addresses have been scanned. If a packet that is just received indicates a scan of a next successive port and/or IP address within a short amount of time (i.e., a threshold of x sec(s).), it is determined that such accounting information is associated with such aggregation. As yet another example, one aggregation may include a plurality of packets received at a rate which exceeds a predetermined amount.

If it is determined in decision 406 that the accounting information is not associated with a current aggregation, trend information is nevertheless maintained, as indicated in operation 408. The purpose of this is to evaluate whether additional aggregations are warranted. As shown in FIG. 4, it is decided in decision 412 whether the trend warrants the establishment of another aggregation. Decision 412 may be made by applying a set of rules to the trend information. For example, if a predetermined number of successive ports are scanned within a short amount of time, one of the rules may dictate that an additional aggregation is warranted. It should be noted that decisions on whether to establish a new aggregation may be based on statistical analysis, neural network and pattern recognition techniques.

Further, various levels of certainty or confidence level may be established into which the trend is to be fit. In such embodiment, the decision 412 as to whether a trend warrants an additional aggregation may depend on the level of certainty associated with the trend. This may optionally be implemented using statistical analysis, and fuzzy logic, etc.

If it is determined in decision 412 that a new aggregation is warranted, the trend information is used to generate the additional aggregation. See operation 414. If, however, it is determined in decision 412 that a new aggregation is not warranted, the received accounting data is used by the accounting module 304 for accounting purposes, as indicated in operation 415.

Figure 5:
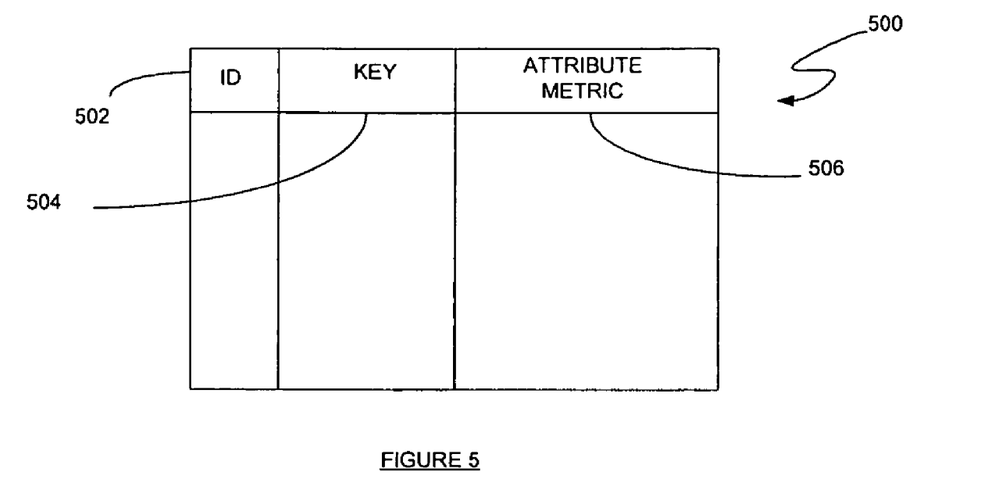
FIG. 5 illustrates a data structure that may be used while processing network accounting information in accordance with the method of FIG. 4.

In order to generate the additional aggregation in operation 414, the packets or records of accounting information which exhibit the trend are represented using a data structure in the form of a table. FIG. 5 illustrates a data structure 500 that may be used while processing network accounting information in accordance with operation 414 of FIG. 4. As shown, aspects of the accounting information are stored including an identifier 502, a key 504, and an attribute metric 506. The identifier 502 uniquely identifies a packet or a record of accounting information that exhibit one trend; the key 504 represents one aspect or attribute of the packet or record that can be defined for trend analysis; the attribute metric 506 may be a array containing all the relevant attributes of the packet or record for trend analysis. It should be noted that the data structure 500 may also be employed while maintaining trend information in operation 408.

When trend information is used to generate an aggregation in operation 414, some of the accounting information in the data structure 500 associated with the trend may already be used earlier in operation 415. Accordingly, there may optionally be a mechanism for preventing redundant use of such accounting information.

If it is determined in decision 406 that the accounting information is indeed associated with a current aggregation, various commands may be generated by the update module 302 for starting, stopping, and updating aggregations in the accounting module 304. Note operation 416. The start command signifies that an aggregation has started, as indicated by an associated trend. Further, the stop command indicates that an aggregation has ceased.

As additional accounting information is received, the update command may be sent to the accounting module 304 in order to update a current aggregation. In the context of the example set forth hereinabove, the aggregation may be updated to include the additional scan of the successive port and/or Internet Protocol (IP) address.

Upon an aggregation being started, stopped, updated by the receipt of the start, stop, and update command by the accounting module 304, respectively, alarms may be generated by the alarm module 306. Note operation 418. It should be noted that these alarms may be issued in response to any one or more of the various commands for the purpose alarming the service providers or operators of network under attach and/or other network conditions.

Further, in operation 420, information may be discarded and/or aggregated in order to prevent the accounting information from causing an overload condition. This prevents the failure of back-end systems. In order to prevent total loss of accounting information that is generated, a summary may be generated by the accounting module 304 at various stages, or states, of the aggregation. For instance, upon the receipt of the stop command, a summary record may be generated. Table 1 illustrates an exemplary summary record of accounting information.

TABLE 1

A <type of attack> attack from <host> started at <start> lasted <duration> seconds and scanned through <IP range> and <Port range>.

The summary record of Table 1 may thus consolidate hundreds of thousands of NetFlow flows or records from a log into a single record. This summarized record may then be used by the accounting module 304 for accounting purposes, as indicated in operation 424. By handling the accounting of the summarized record instead of the raw data as in operation 415, the mediation/billing process is capable of preventing overflow in back-end accounting systems.

Figure 6:
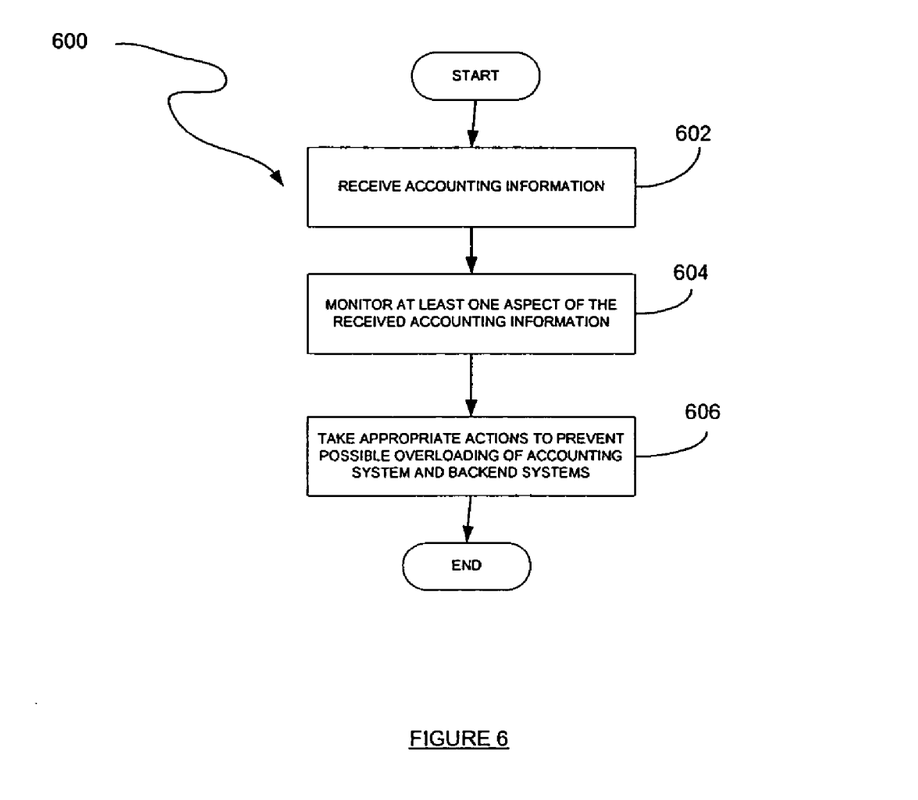
FIG. 6 is a flowchart showing a generalized method of processing network accounting information for the purpose of defending against network attacks and dealing with heavy network traffic.

FIG. 6 is a flowchart showing a generalized method 600 in which the method 400 of FIG. 4 processes network accounting information for the purpose of defending against network attacks and dealing with heavy network traffic. With reference to FIG. 6, accounting information is first received utilizing a network in operation 602. During use, at least one aspect of the received accounting information is monitored. Note operation 604. It should be noted that such aspects may be monitored by an internal or external tool/mechanism. In other words, the various operations may be carried out by different tools or mechanisms. In the case of using an external tool/mechanism, an indication of a particular aspect of the received accounting information may be received for identification purposes.

Thereafter, appropriate actions may be invoked to present possible overloading of accounting system and back-end systems. For example, at least a portion of the accounting information is discarded and/or aggregated based on the monitored or identified aspect, as indicated in operation 606.

In one embodiment, the monitoring step may include detecting a scan of a plurality of ports and/or Internet Protocol (IP) addresses. Further, such step may include monitoring a rate of receipt of the accounting information. More particularly, such step may include detecting whether a rate of receipt of the accounting information exceeds a predetermined amount. In other words, the foregoing aspect of the accounting information may be any parameter, attribute, characteristic, etc. that indicates an attack and/or a potential overload of an accounting system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving accounting over a network; and
after receiving the accounting information:
discarding at least a portion of the accounting information that occurs during a surge in network traffic, based on at least one attribute of the accounting information;
processing at least a portion of the accounting information, based on at least one attribute of the accounting information; and
after the processing, allowing at least a portion of remaining accounting information to pass to subsequent accounting processing;
wherein the portion of the accounting information that is discarded is done so to prevent an overload of the subsequent accounting processing.

2. The method as recited in claim 1, wherein the accounting information is discarded for dealing with heavy network traffic.

3. The method as recited in claim 2, and further comprising generating a summary of the accounting information.

4. The method as recited in claim 1, and further comprising monitoring at least one aspect of the accounting information.

5. The method as recited in claim 4, wherein the portion of the accounting information is further discarded based on the monitored at least one aspect.

6. The method as recited in claim 4, wherein the monitoring includes detecting a scan of a plurality of ports.

7. The method as recited in claim 4, wherein the monitoring includes monitoring a rate of receipt of the accounting information.

8. The method as recited in claim 7, wherein the monitoring includes detecting whether the rate of receipt of the accounting information exceeds a predetermined amount.

9. The method as recited in claim 4, wherein the monitoring includes monitoring a load on a system receiving the accounting information.

10. The method as recited in claim 1, wherein the network includes a packet-switched network.

11. The method as recited in claim 10, wherein the network includes the Internet.

12. The method as recited in claim 1, wherein the portion of the accounting information is discarded and the portion of the accounting information is processed based on the same at least one attribute of the accounting information.

13. The method as recited in claim 1, wherein the portion of the accounting information is discarded and the portion of the accounting information is processed based on a different at least one attribute of the accounting information.

14. The method as recited in claim 1, wherein the processing includes analyzing, accounting, and summarizing.

15. The method as recited in claim 1, wherein the processing includes aggregating.

16. The method as recited in claim 1, wherein the processing includes summarizing.

17. The method as recited in claim 1, wherein the processing includes analyzing.

18. The method as recited in claim 1, wherein the processing includes accounting.

19. The method as recited in claim 1, wherein the processing occurs after the discarding.

20. The method as recited in claim 1, wherein the discarding occurs after the processing.

21. The method as recited in claim 1, wherein the at least one attribute is selected from the group consisting of a source address, a destination address, a port number, a protocol type, a user identification, a number of input packets, a number of packets in a session, a number of packets in a flow, a time of reception of a packet.

22. A computer-implemented method, comprising:
receiving accounting information over a network; and
after receiving the accounting information:
processing at least a portion of the accounting information, based on at least one attribute of the accounting information;
after the processing, discarding at least a portion of the accounting information that occurs during a surge in network traffic, based on at least one attribute of the accounting information; and
after the discarding, allowing at least a portion of remaining accounting information to pass to subsequent accounting processing;
wherein the portion of the accounting information that is discarded is done so to prevent an overload of the subsequent accounting processing;
wherein the processing includes aggregating.

23. A computer program product embodied on a computer readable medium, comprising:
computer code for receiving accounting information over a network; and
computer code for, after receiving the accounting information;
discarding at least a portion of the accounting information that occurs during a surge in network traffic, based on at least one attribute of the accounting information;
after the discarding, processing at least a portion of the accounting information, based on at least one attribute of the accounting information and
after the processing, allowing at least a portion of remaining accounting information to pass to subsequent accounting processing;
wherein the portion of the accounting information that is discarded is done so to prevent an overload of the subsequent accounting processing;
wherein the portion of the accounting information is discarded and the of the accounting information is processed based on a different at least one attribute of the accounting information.

* * * * *

UNITED STATES PATENT AND TRADEMARK OFFICE
CERTIFICATE OF CORRECTION

| | | |
|---|---|---|
| PATENT NO. | : 7,266,602 B2 | Page 1 of 1 |
| APPLICATION NO. | : 11/441423 | |
| DATED | : September 4, 2007 | |
| INVENTOR(S) | : Givoly | |

It is certified that error appears in the above-identified patent and that said Letters Patent is hereby corrected as shown below:

In the claims:

Col. 7, line 7, please replace "accounting over" with --accounting information over--;

Col. 8, lines 38-39, please replace "information;" with --information:--;

Col. 8, line 45, please replace "information" with --information;--;

Col. 8, line 53, please replace "the of" with --the portion of--.

Signed and Sealed this

Thirty-first Day of May, 2011

David J. Kappos
*Director of the United States Patent and Trademark Office*